3,350,602
GASEOUS-DISCHARGE DEVICE HAVING A TRIGGER ELECTRODE AND A LIGHT PRODUCING SPARK GAP TO FACILITATE BREAKDOWN BETWEEN THE TRIGGER ELECTRODE AND ONE OF THE PRINCIPAL ELECTRODES
Kenneth J. Germeshausen, Weston, and John L. Turner, Needham, Mass., assignors to EG&G, Inc., a corporation of Massachusetts
Continuation of application Ser. No. 78,587, Dec. 27, 1960. This application Feb. 11, 1965, Ser. No. 438,155
9 Claims. (Cl. 315—150)

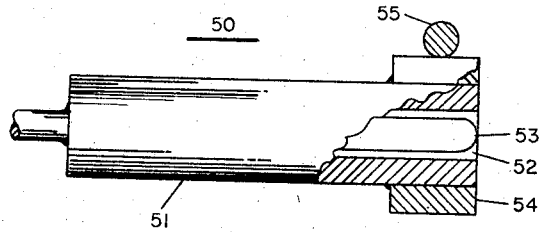
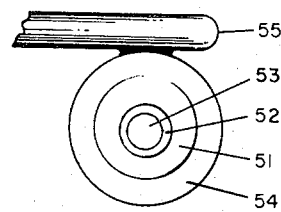
FIG. 1A
FIG. 1B
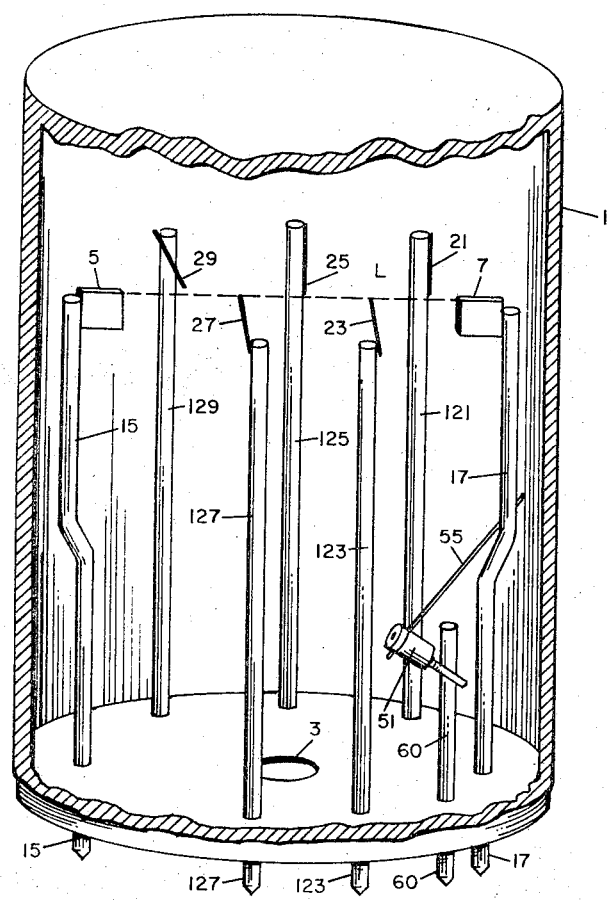
FIG. 2
INVENTORS
Kenneth J. Germeshausen
John L. Turner INVENTORS
Kenneth J. Germeshausen
John L. Turner United States Patent Office 3,350,602
Patented Oct. 31, 1967

The present invention relates to gaseous-discharge devices, and more particularly to spark gaps and to means and methods for using the same to improve the operation of gaseous-discharge flashtubes of the type useful to produce flash illumination in stroboscopic systems, flash-photography systems, and the like.

This is a continuation of copending application Ser. No. 78,587, filed by the applicants herein on Dec. 27, 1960, and entitled "Gaseous-Discharge Device and Method."

Applicant Germeshausen's copending application Ser. No. 598,325, filed on July 17, 1956, now U.S. Letters Patent No. 2,977,508, issued on Mar. 28, 1961, discloses a novel gaseous-discharge device and system. The subject invention is useful in this and other gaseous-discharge devices to materially improve the performance thereof as hereinafter pointed out.

There has long been a problem of initiating regular and uniform discharges in gaseous-discharge flashtubes. It is believed that in order to initiate a discharge, there must be ions or free electrons available in the discharge region which can be affected by the electric field produced at the trigger electrode when the trigger impulse is applied. The electric field drives the ions or electrons through the gas toward one of the principal electrodes and the resulting collisions with gas molecules produces ionization thereby initiating the discharge. In the presence of ambient light, the problem of initiation is less severe because there are photons available to produce some photoelectrons which will be affected by the electric field produced at the trigger electrode. In any particular case there may or may not be sufficient photoelectrons to effect consistent breakdown, but it can be said in general that the problem becomes more serious as the intensity of the ambient light decreases, and in substantially total darkness the problem is greatest. Because it is greatest in total darkness, we shall refer to this phenomenon as the "dark-start" problem, but this term also includes the full range of ambient light as well as complete darkness.

The "dark-start" problem becomes even more serious in flashtubes operating at low average power levels, such as single flashes; irregular flash frequencies as when the flashtube is triggered in response to the random occurrence of an event; or in stroboscopes or other repetitive flash precision applications at very low flash rates in the order of, for example, ten flashes per second or less. In such cases, flashtubes have demonstrated a tendency to skip, to fire late, or, at the low flashing rates, to fire irregularly or not at all.

Many solutions have been tried in the past to overcome this problem, each of which has been attended with certain disadvantages. It was first thought that by increasing the potential across the principal electrodes to a point just below the "self-fire" or breakdown voltage, and increasing the trigger impulse, the "dark-start" problem could be eliminated. Actual tests have shown that this approach lessened the undesirable effects caused by the problem but in so doing, it rendered the flash device considerably less stable and, therefore, subject to accidental triggering by stray electric fields.

A second method was to sputter a coating of barium or cesium onto the active surfaces of the electrodes from a getter, but this method darkened the envelope thereby reducing the light output, but, more important, it also greatly increased the probability of premature firing and hold-over which become more serious the longer the tube was used.

Another method that was used was to enclose one or more trigger electrodes in an electrically insulating ceramic sleeve; but in this method the ceramic material blocks some of the light output and also created a tendency for the main discharge to waver and wander. By still another method, a substantial amount of radioactive material was incorporated in the tube, but this method so greatly increased the handling problems for both the flashtube itself and the equipment in which it is used that the practical disadvantages far outweighed the improvement attained.

It is, therefore, an object of this invention to provide a novel method for overcoming this "dark-start" problem and to provide a novel gaseous-discharge device that has good "dark-start" characteristics without the accompanying disadvantages found in the aforementioned method.

Another object of this invention is to provide a novel gaseous-discharge device which, while overcoming the "dark-start" problem, is economical to manufacture and, at the same time, is more efficient and dependable with increased light output.

A further object of the invention is to provide a novel spark-gap having optimum discharge characteristics.

Still another object of this invention is to provide a spark-gap for operation within a gaseous-discharge flashtube and where the trigger voltage of the flashtube and the discharge voltage of the spark-gap are provided by a common triggering impulse. In summary the present invention consists of a spark-gap of unique design which provides a source of electromagnetic energy in the range between infra-red and ultra-violet, which energy impinges upon at least one of the principal electrodes of a gaseous discharge flashtube at substantially the same time that the device is triggered. Preferred constructional details and other features are hereinafter treated. Other and further objects are pointed out in the following specification and the appended claims. For simplicity of expression, the term "light" as hereinafter used, shall mean electromagnetic energy within the range from infra-red through visible light to ultra-violet inclusive.

The principle of using radiation to impinge upon an electrode has had many applications in the past, such as, phototubes, radiation counters etc. The principle has been used in prior art devices to delay the initiation of an electric discharge. This principle, employed as disclosed herein, assists in initiating an electric discharge in gaseous discharge devices and particularly when the same are positioned in an environment of substantially total darkness.

The invention will now be described in connection with the accompanying drawings FIGURES 1A and 1B of which are standard projections of a spark-discharge device, hereinafter referred to as "sparker," constructed in accordance with a preferred embodiment, FIGURE 1A being a side view partially cut away to illustrate details of construction, and FIGURE 1B being an end view of the right-hand end of the sparker shown in FIGURE 1A;

FIGURE 2 is a perspective view, partially cut away, of a gaseous-discharge flashtube utilizing the sparker shown in FIGURE 1;

Figure 3:
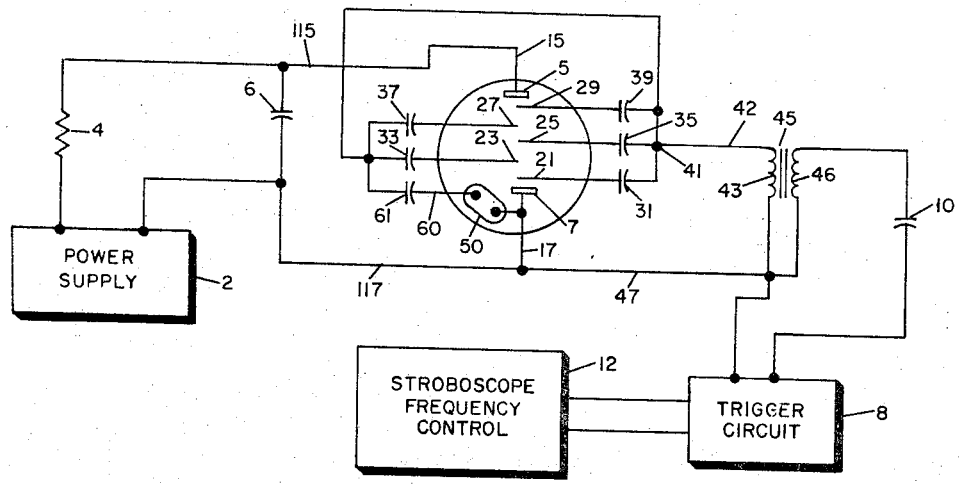
FIGURE 3 is a schematic circuit diagram illustrating a preferred electrical system for operating the flashtube of FIGURE 2.

FIGURES 1A and 1B show a sparker, indicated generally by reference designator 50, which consists of a cylindrical block of an electrically insulative material 51 such as, for example, ceramic and having a hollow cylindrical portion 52 extending the length of the ceramic block 51 and substantially coaxial thereto. A conductive-metal probe 53 of, for example, tungsten, is inserted in the hollow portion 52, terminating at the end of the block at the right-hand side shown in FIGURE 1A and sealed to and extending out of the block 51 at the left-hand end for purposes hereinafter indicated. A conductive metal ring 54, of, for example, kovar, is firmly attached to the exterior surface of the block 51 at its right-hand end by brazing, crimping or the like. Attached to the metal ring 54, as by welding or the like, is a conductive metal lead 55 whose function will be shown below.

The sparker 50 is essentially a two-electrode spark gap designed to produce an electric discharge between the probe 53 and the metal ring 54 when an electric impulse is fed to the probe 53. The sparker has been designed for use in a gaseous-discharge flashtube as shown in FIGURE 2, and also to operate from the trigger impulse of the flashtube. It is, therefore, necessary that the sparker be highly efficient and dependable. The design must be such that a discharge is assured each time the flashtube is triggered. In order to make the most efficient use of the voltage of the impulse fed to the probe 53 to effect breakdown, it is essential to develop as intense an electric field as is practicable at the surface of probe 53. Many factors are involved in designing a spark discharge device having a very intense electric field adjacent to one of the electrodes, and for this reason, a theoretical discussion of the subject will help to explain the advantages of the subject configuration.

Starting with the case of a pair of parallel-plane conductors of infinite extension, separated from each other by a distance $d$ and subjected to a voltage $V$, a uniform electric field is produced which may be expressed as $E = V/d$ where $E$ is the electric field at each point between the conductors.

It is well known that if a coaxial configuration is substituted for the parallel-plane conductors, but maintaining the voltage and the separation distance between the conductors, the same, the electric field at the surface of the center conductor is more intense than that found in the aforesaid parallel-plane system. We have discovered that the intensity of the electric field at the surface of the center conductor can be further increased many fold by inserting an insulating body between the center and outer conductors and optimizing the design of the unit.

The six most important parameters which affect the intensity of the electric field at the surface of the center conductor are (1) the dielectric constant (K) of the insulating material disposed between the center and outer conductors; (2) the radius of the center conductor ($r_1$); (3) the inside radius of the insulating material ($r_2$); (4) the outside radius of the insulating material ($r_3$); (5) the inside radius of the outer conductor ($r_4$); and (6) the voltage (V).

In order to simplify this discussion we shall make certain of these parameters constant and we shall use the quantities of a sparker designed for use with the flashtube of FIGURE 2, as the constants. The insulative material should preferably be one having a high dielectric constant in the range of, say, 8.60 to 9.50 or higher, and it should, of course, have sufficient dielectric strength to withstand the electric fields produced therein. In the sparker 50, we used a high alumina ceramic (94% $Al_2O_3$) having a dielectric constant of approximately 8.80. Our choice of ceramic cylinders was limited by the small variety in sizes that were commercially available, thereby limiting our choice of $r_2$ and $r_3$. Accordingly, we choose a ceramic cylinder having an outside radius ($r_3$) of 0.020 inch and an inside radius ($r_2$) of 0.005 inch.

We have discovered that with respect to the radius of the outer conductor ($r_4$) the most intense electric field is found at the surface of the center conductor when the outer conductor is sealed to the outer surface of the ceramic cylinder. If there is a spacing between the outer conductor and the ceramic, then as this spacing is increased, the intensity of the electric field at the surface of the center conductor decreases. For this reason, $r_4$ was made as close to $r_3$ as practical. Therefore, $r_3$ and $r_4$ may be considered equal.

Theoretically, for such a coaxial structure of infinite lengths and perfect concentricity, the electric field E at the surface of the center conductor is given by the following formula:

(1) $$E = VG$$

where (2) $$G = \frac{1}{r_1 \left( \frac{1}{k} \ln \frac{r_3}{r_2} + \ln \frac{r_2}{r_1} \right)}$$

Figure 5:
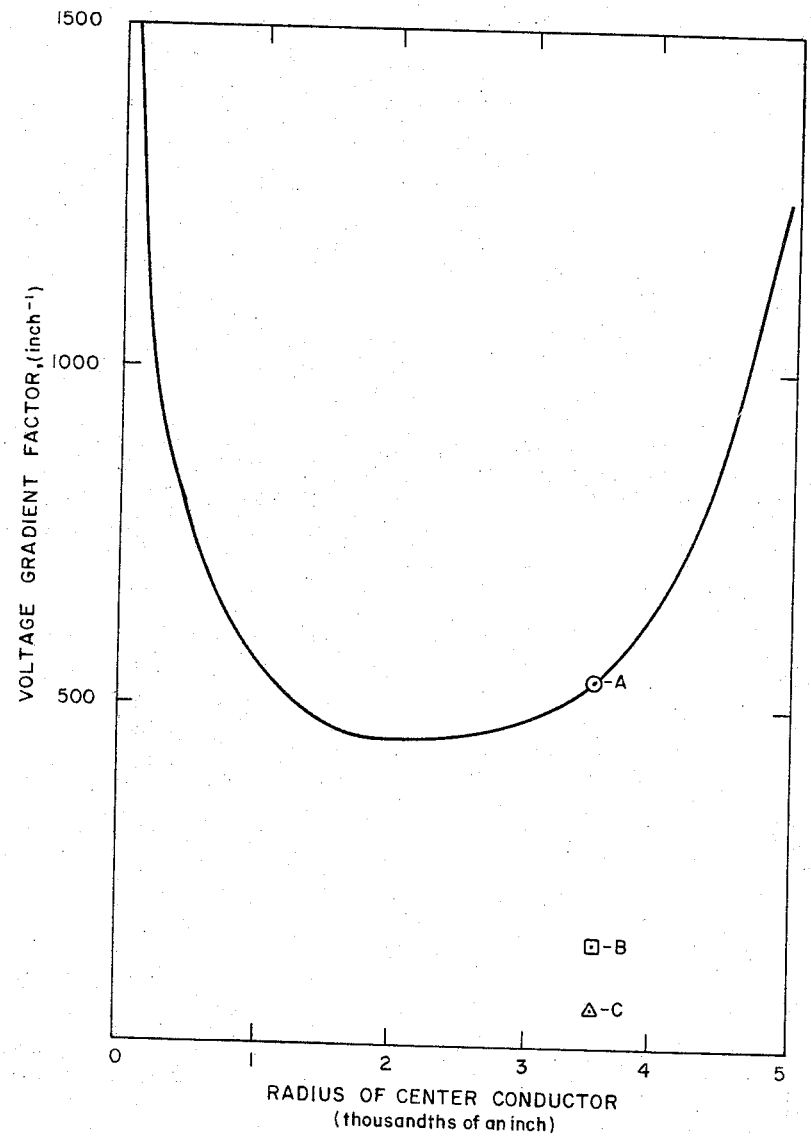
FIGURE 5 is a graph depicting the effects of variations in the design of the sparker.

Therefore by using the value G, the voltage gradient factor which may be defined as that factor which when multiplied by the voltage V applied between the inner and outer conductors, results in the electric field E at the surface of the center conductor, the effect of varying the radius of the center conductor $r_1$ upon the voltage gradient factor, G, can be shown independent of the voltage applied. By Formula 1 the intensity of the electric field may be obtained. FIGURE 5 is such a graph.

The curve of FIGURE 5 which was plotted with $r_2$, $r_3$, $r_4$, and K held constant demonstrates the variation in the voltage gradient factor G and therefore, in the electric field E also, as the center conductor varies from an infinitesimally thin wire to one approaching the size of the hollow portion of the ceramic insulator $r_2$. It can be seen that the maximum G is obtained when the radius $r_1$ is a minimum. Obviously, when the radius $r_1$ reaches zero, there is no center conductor and G is also zero. This curve tends to show that the most intense electric field is obtained by using a center conductor with the smallest radius. This is theoretically true, but practical disadvantages sometimes make it more advantageous to utilize the increase in G obtained by large-radius center conductors as shown by the curve at the right-hand side of FIGURE 5. The disadvantages involved in using extremely fine wire for the center conductor include the fragility of such a wire causing erosion which, in turn, results in a limited service life and the difficulty in handling, assembling, and accurate and stable positioning.

These disadvantages may be less important in other applications of sparkers but for use with flashtubes of the type hereinafter described, practical considerations require that the up-swing of the curve at the larger radii be used. It should be pointed out, however, that the increase in G with the increase of $r_1$ does not continue to the point where $r_1$ is a maximum or $r_1$ equals $r_2$. It has been found experimentally that when $r_1$ and $r_2$ are equal, that is, when the center probe is sealed to the ceramic insulator, the sparker requires a very high voltage to cause breakdown (low effective G). The reason for this is easily found in the theoretical analysis of the electric field within such a sealed, idealized structure and the electric field throughout the volume of the sparker is identical to that in the case of no ceramic at all. It should be further pointed out that there may be another restriction in the approach of $r_1$ to $r_2$ to effect maximizing of G on the right-hand side of the curve of FIGURE 5. As the gap between $r_1$ and $r_2$ approaches approximately one mean-free-path of ions and electrons in the gas under the conditions of use, an incipient discharge may be "starved" for atoms or molecules to ionize, and so the idealized minimum of breakdown voltage may not be achieved for this reason.

The curve of FIGURE 5 indicates that the most intense electric fields on the surface of the center conductor is obtained when the radius of center conductor is somewhat less than the inside radius of the insulator. Any point, however, on this curve is a substantial improvement over the corresponding values for coaxial systems without a ceramic insulator, and parallel-plane systems. This is graphicaly illustrated in FIGURE 5 by the point A which shows a center conductor 0.0035 inch has voltage gradient factor of approximately 556 per inch while the corresponding points for a coaxial system without an insulator is approximately 165 per inch (point B) and for the parallel-plane system is approximately 61 per inch (point C). The electric field indicated by point A is more than three times that of point B and more than nine times that of point C. The radius 0.0035 inch was chosen for this example because it is the value which we used in the sparker shown in FIGURE 1A. A center conductor with a greater radius could have been chosen to further increase the electric field, but it was convenient for production purposes to use the value chosen in order to use a wire size identical to that of the trigger probes 21, 23, 25, 27 and 29 (see FIGURE 2); and also for ease of assembly, still giving adequately low breakdown voltage, commensurate with tube triggering requirements and trigger probe breakdown voltages.

The curve of FIGURE 5 is theoretical for a coaxial unit of infinite length and perfect concentricities and, therefore, any physical embodiment of these principles will, of course, result in modifications in the curve. Even with these modifications, the curve indicates the relationship between the named factors and is highly useful for this purpose.

Although the probe 53 is shown terminating at the end of and disposed in the center of, the ceramic block 51, such termination and disposition are not essential and modifications thereof may be resorted to without departing from the spirit and scope of this invention.

The ceramic block 51 and the probe 53 are held in fixed relationship by sealing the probe 53 to the left end of the ceramic block as shown in FIGURE 1A, and by ring 54 at the right end which is attached to the ceramic 51 and to the cathode support 17 (see FIGURE 2).

The flashtube in FIGURE 2 is shown having a glass, fused quartz or similar light-transparent envelope 1 with a planar top and cylindrical side walls. This particular configuration has the advantages of maximum light output through the planar top and minimum space required for mounting the flashtube. The gaseous medium, such as xenon and the like, may be sealed within the envelope 1, as, for example, by closing off the gas-filled inlet tube 3, in the base of the envelope 1. For the purposes of variable-frequency stroboscopes and the like, it is preferable that the gas be maintained at a high pressure of the order of, say, one-third to three atmospheres, more or less. An anode electrode 5 and a cathode electrode 7, preferably both of the same construction, are supported spaced from one another within the envelope 1 by conductive supports 15 and 17 that extend outside the base of the envelope through the bottom wall thereof. The cathode 7 and the anode 5 are preferably both of the sintered cold-cathode type disclosed in applicant Germeshausen's prior United States Letters Patent No. 2,492,142, issued Dec. 27, 1949, and they are illustrated in FIGURE 2 as substantially similar rectangular-surface pills disposed substantially parallel to one another. Such sintered electrodes are capable of withstanding the gaseous bombardment inherent in the operation of closely spaced electrodes at substantial voltages in a high-pressure gas.

Disposed within the space between the substantially parallel opposing surfaces of the anode 5 and the cathode 7 are a plurality of probe-type trigger or control electrodes 21, 23, 25, 27 and 29, of, for example, tungsten. While five such trigger electrodes are illustrated, more or less trigger electrodes may be employed consistent with the separation between the anode 5 and the cathode 7 and the hereinafter described required discharge-conducting or guiding function of the plurality of trigger electrodes. Trigger electrodes 21, 23, 25, 27 and 29 are supported by and electrically attached to, by welding or the like, conductive-support pins 121, 123, 125, 127 and 129 respectively. These pins enter the flashtube through the base thereof at points spaced from the side walls. The trigger electrodes are attached to the pins at approximately right angles, with the free ends of the trigger electrodes terminating in the space between the anode 5 and the cathode 7.

The free ends of trigger electrodes 23, 25, and 27 lie along a straight line L (shown dotted) between the center points at the top of the facing surfaces of the anode 5 and the cathode 7. The free ends of trigger electrodes 21 and 29 lie along a line (not shown) extending from the top corners of the facing surfaces of the anode 5 and the cathode 7 on the same side of the envelope that these trigger electrodes 21 and 29 are attached to their respective supports 121 and 129. This configuration is shown more clearly in FIGURE 4. The free ends of trigger electrodes 21 and 29 are so terminated to insure that the arc breakdown between these trigger electrodes and the principal electrodes adjacent to each, takes place only at the free ends of these trigger electrodes and not at different places along the trigger electrodes which might be the case if these electrodes were extended to line L. By this design, the discharge is still maintained within the space between the cathode 7 and the anode 5, but, more important, it is always along the same path within that space. Although the discharge path is not a straight line, the actual discharge follows a substantially straight line when viewed from a short distance.

By this construction, the electrodes are closest to each other at their free-ends, thus insuring that the discharge is confined to the space between anode 5 and cathode 7 and not elsewhere in the flashtube. Further to achieve this end trigger electrodes 21, 25 and 29 are supported on one side of the tube by conductive pin supports 1-21, 125, and 129 respectively, and trigger electrodes 23 and 27 and sparker 50 are supported at the other side upon conductive-pin supports 123, 127 and 60 respectively. These precautions are important since a large safety margin is essential to render substantially impossible arcing at the base of the flashtube. Sparker 50 is disposed within the gas of the flashtube but remote from the discharge path between the cathode 7 and the anode 5. Sparker 50 is positioned so that the light produced when it is energized will impinge, either immediately or by reflection, on one of the principal electrodes to assist in initiating a discharge in the flashtube.

In accordance with the present invention, a voltage is applied between the anode 5 and the cathode 7 that is of itself insufficient to produce a discharge therebetween through the gas. A trigger impulse is applied to break down the gas in the neighborhood of either the anode 5 or the cathode 7 between the same and the adjacent trigger electrode 29 or 21, respectively. In this embodiment, breakdown is first initiated at the cathode 7. Simultaneously, the trigger pulse is also fed to probe 53 of sparker 50 through conductive-pin support 60 causing a discharge to take place between probe 53 and metal ring 54 which is shown connected to the cathode support 17 by conductive wire 55. The electrode arrangement and geometry of the sparker 50, as has been pointed out, are such that the required breakdown potential between probe 53 and metal ring 54 is less than that between cathode 7 and adjacent trigger electrode 21 thereby insuring that a discharge will take place between probe 53 and ring 54 each time the flashtube is triggered. The light from sparker 50 impinges upon the cathode 7 at the same time that the trigger impulse is applied to adjacent electrode 21. As the light from the sparker 50 impinges upon the cathode 7, electrons are released from the cathode 7 which are subjected to the electric field produced by the trigger impulse at trigger electrode 21. The electrons, under the force of the electric field, collide with the gas molecules thereby producing ionization of the gas and the initiation of the discharge. Once the discharge is initiated between trigger electrode 21 and the cathode 7, the ionization continues along the successive trigger electrodes 23, 25, 27 and 29 until the impedance between cathode 7 and anode 5 is reduced so the main discharge takes place as disclosed in the aforesaid copending application of applicant Germeshausen. The light emitted by sparker 50 is not restricted to fall upon the cathode 7 only, but may impinge upon all the tube elements where it may serve to assist in ionizing the gas along the entire discharge path. It should be noted that it is the light output of the sparker 50 which is used to initiate the discharge and not ionization of the gas produced by the sparker discharge. The ionization of the gaseous medium caused by the sparker discharge is kept remote from the discharge path between the cathode 7 and the anode 5 and therefore has no effect upon it. The limited local ionization caused by the sparker 50 is also ineffective to produce any arcing at the base of the flashtube. Because the successive trigger electrodes cause a series-break-down conducting or guiding process, the discharge takes place accurately along a fixed path without wandering or fluctuating. The initiation of the discharge is shown starting at the cathode 7 but it could be started at the anode 5 in a similar manner.

Figure 4:
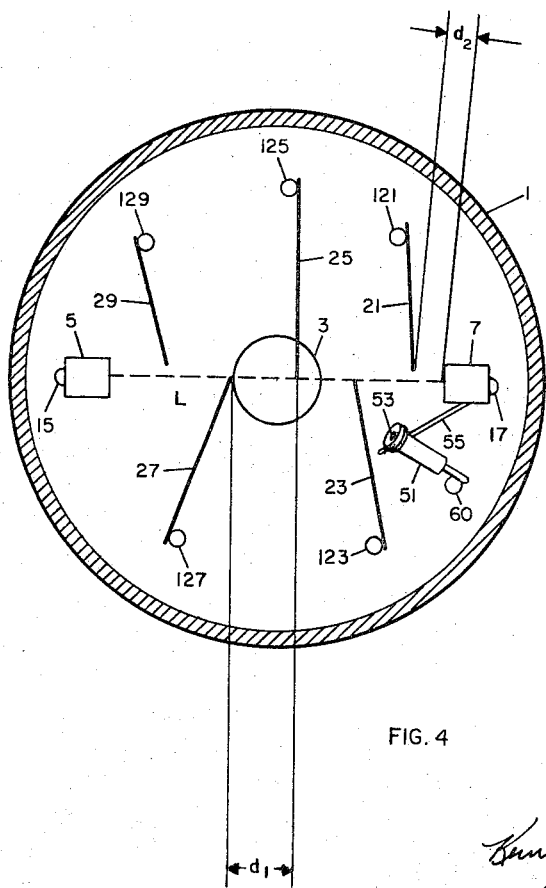
FIGURE 4 is a plan view, partially cut away, of the gaseous-discharge flashtube of FIGURE 2, showing the disposition of the tube elements.

FIGURE 4 shows that the spacing $d_1$ between the free ends of the trigger electrodes 25 and 27, which is representative of the distances between the free ends of all the adjacent electrodes and between the free end of electrode 29 and anode 5, is substantially uniform. The reason for this substantially equal spacing resides in the fact that the minimum breakdown potential between successive trigger electrodes must be substantially equal in order to insure the successive guiding of the breakdown in the desired successive series path. The spacing $d_2$ between the free end of trigger electrode 21 and cathode 7 is, however, substantially less than the spacing between the other trigger electrodes, $d_1$, on the order of one-third to one-half of spacing $d_1$. This insures that the breakdown is initiated at the cathode 7 and not at the anode 5 and particularly it avoids the possibility of breakdown commencing from the cathode 7 and then starting at the anode 5, leaving the intermediate region of the space unionized.

It will be observed that no insulation is required on any of the trigger electrodes 21, 23, 25, 27, and 29 because the device is so designed that the trigger electrodes are never close enough to each other to cause breakdown between them except at their free ends, which is the desired breakdown path. In the aforesaid copending application insulating sleeves were required on each of the two trigger electrodes closest to the cathode 7 and the anode 5. As there stated, the insulating material served to aid in the initial arc breakdown to the adjacent cathode 7 or anode 5 by reducing the required breakdown potential. In the present invention, however, no insulation is required on any of the trigger electrodes. By designing the device in such a way that the spacing between trigger electrode 21 and the cathode 7 is substantially less than the distance between the other trigger electrodes and between trigger electrode 29 and the anode 5, the requirement for insulating the electrodes closest to the cathode 7 and the anode 5 is eliminated.

The electric circuits for operating the flashtube of the present invention may assume the form illustrated in FIGURE 3 in which a flash capacitor or capacitors 6 is or are charged through a limiting impedance 4 from a power-supply energy source 2. The upper and lower terminals of the capacitor 6 are shown connected by conductors 115 and 117, respectively, to the pins 15 and 17 connected with the anode 5 and the cathode 7. The voltage thus developed between the anode and cathode is, as before explained, insufficient in and of itself to effect a discharge therebetween. A trigger circuit 8 may comprise a thyratron or other switching circuit adapted to discharge a capacitor 10 through the primary winding 46 of a trigger transformer 45 to produce a trigger pulse. The trigger circuit 8 may be controlled by a stroboscope frequency control 12, as of the type disclosed in United States Letters Patent No. 2,331,217, issued to applicant Germeshausen on Oct. 12, 1943. The trigger pulse so produced causes sparker 50 to fire and initiates or triggers the successive electrode breakdown before-discussed in order to permit the energy stored in the capacitor 6 to discharge between the anode 5 and the cathode 7, thereby to produce a high-intensity brief flash or repetition of flashes. Trigger circuits of this character are also disclosed in United States Letters Patent No. 2,478,901, issued on Aug. 16, 1949, to Harold E. Edgerton.

The center probe 53 of sparker 50 and each of the trigger electrodes 21 23, 25, 27 and 29 are provided with an electrical connection from the respective pins 60 and 121, 123, 125, 127 and 129, that includes an isolating impedance. The isolating impedances are illustrated as respective capacitors 61, 31, 33, 35, 37 and 39 which are all connected together at 41 and by a conductor 42 to the upper terminal of a preferably step-up secondary winding 43 of the trigger transformer 45. The lower terminal of the secondary winding 43 is connected by conductor 47 to the cathode 7 and is connected, also, to the lower terminal of the primary winding 46. The trigger pulse developed in the trigger transformer 45 will therefore cause the sparker 50 to produce light and the successive series trigger-electrode breakdowns, terminating in the discharge of the flash capacitor 6 between the anode 5 and cathode 7. Repetitive trigger pulses will effect repetitive discharges of this character, the frequency of repetition being limited principally by the charging time constant of the flash capacitor charging circuits 2, 4, 6, and the deionization time of tube 1.

As an illustration, a flashtube of the above-described character containing xenon gas at about two-thirds of an atmosphere pressure and having a short space between the anode and cathode of about five-sixteenths of an inch, spacing $d_1$ between successive electrodes of approximately 0.05 inch, and spacing $d_2$ of approximately 0.02 inch, has been operated stroboscopically with a capacitor 6 of about 0.5 microfarad, with a flashing voltage of about 650 volts, with a trigger voltage of about 2,000 volts (transformer output). Over a period of 500 hours of repetitive-flashing life-testing operation at sixty flashes per second, and on testing in complete darkness at low flash rates (one flash every 2 seconds), the flashtube fired uniformly without any of the above-mentioned characteristics of the "dark-start" problem.

Although we have described our invention with a certain degree of particularity in connection with the preferred embodiment, the invention has a much broader scope and all changes and modifications are deemed to fall within the spirit and scope of this invention as defined in the appended claims.

We claim:
1. A gaseous-discharge device comprising:
 a gas-filled envelope;
 a pair of principal electrodes spaced from each other within the envelope and connected to a source of potential normally ineffective to produce a discharge therebetween;
 a trigger electrode disposed adjacent the space between the principal electrodes for ionizing the gaseous medium therebetween in response to the application thereto of a triggering impulse;
 a light-producing two-electrode spark gap disposed remote from said space between the principal elec- trodes where the light, emitted when the spark gap is energized, is directed to impinge upon one of said pair of principal electrodes to facilitate breakdown between the trigger electrode and said one of the principal electrodes; and means for simultaneously energizing said trigger electrode and one electrode of said spark gap.

2. A gaseous-discharge device comprising:

a gas-filled envelope;

a pair of principal electrodes spaced from each other within the envelope and connected to a source of potential normally ineffective to produce a discharge therebetween;

a trigger electrode disposed adjacent the space between the principal electrodes for ionizing the gaseous medium therebetween in response to the application thereto of a triggering impulse;

a light-producing two-electrode spark gap disposed remote from said space between the principal electrodes where the light, emitted when the spark gap is energized, is directed to impinge upon one of said pair of principal electrodes to facilitate breakdown between the trigger electrode and said one of the principal electrodes; and means for simultaneously applying triggering stimuli to said trigger electrode and one electrode of the spark gap from a common source.

3. A gaseous-discharge device comprising:

a gas-filled envelope;

a pair of spaced principal electrodes disposed within the envelope and connected to a source of potential normally ineffective to produce a discharge therebetween;

a plurality of trigger electrodes disposed in the space and direction between said principal electrodes, and connected to a source of electrical impulses;

a normally unenergized spark gap disposed within the envelope in a position remote from the space between said principal electrodes but a position from where, when energized, the light produced thereby impinges upon at least one of said principal electrodes, said spark gap having a cylindrical insulating member with a first electrode disposed therein and a second electrode disposed on the outer surface thereof, one spark-gap electrode being connected to said source of electrical impulses; and means for simultaneously energizing said plurality of trigger electrodes and said spark gap from said source of electrical impulses.

4. A gaseous-discharge device comprising:

a gas-filled envelope;

a pair of spaced principal electrodes disposed within the envelope and connected to a source of potential normally ineffective to produce a discharge therebetween;

a plurality of trigger electrodes disposed in the space and direction between said principal electrodes, and connected to a source of electrical impulses; and a normally unenergized spark gap disposed within the envelope in a position remote from the space between said principal electrodes but in a position from where, when energized, the light produced thereby impinges upon at least one of said principal electrodes, said spark gap having a cylindrical insulating member with a first electrode disposed therein and terminating at one end thereof, and a second electrode disposed on the outer surface thereof adjacent said one end of the insulating member, one spark-gap electrode being connected to said source of electrical impulses for simultaneously energizing said plurality of trigger electrodes and said spark gap therefrom.

5. A gaseous-discharge device comprising:

a gas-filled envelope;

a pair of principal electrodes spaced from each other within the envelope and connected to a source of potential normally ineffective to produce a discharge therebetween;

a plurality of trigger electrodes having their free ends successively disposed in the space and direction between said principal electrodes, the trigger electrode adjacent to the first of the said pair of principal electrodes disposed a predetermined distance from the said first principal electrode, while the other trigger electrodes are disposed from adjacent trigger electrodes and from the second of the pair of principal electrodes at intervals greater than the said predetermined distance, the said intervals being less than the distance from the free end of each trigger electrode to any portion of the envelope;

a light-producing two-electrode spark gap disposed remote from said space between the principal electrodes where the light emitted when the spark gap is energized is directed to impinge upon said first principal electrode to facilitate breakdown between the first principal electrode and the trigger electrode adjacent thereto; and means for connecting the trigger electrodes and one electrode of the spark gap to a common source of energy to provide simultaneous excitation of the trigger electrodes and the spark gap.

6. A gaseous-discharge device comprising:

a gas-filled envelope;

an anode positioned within the envelope;

a cathode spaced from the anode within the envelope said anode and cathode being connected across a source of potential normally ineffective to cause a discharge therebetween;

a plurality of trigger electrodes having their free ends successively disposed in the space and direction between the anode and cathode, the trigger electrode adjacent to the cathode disposed a predetermined distance from the cathode while the other trigger electrodes are disposed from adjacent trigger electrodes and from the anode at substantially equal intervals greater than the said predetermined distance, the said equal intervals being less than the distance from the free end of each trigger electrode to any portion of the envelope;

a light-producing two-electrode spark gap disposed remote from said space between the anode and cathode in order that ionization of the gas in the region of the spark gap when the same is energized has no effect upon the space between the principal electrodes but the light produced thereby impinges upon the cathode, the first of the two-spark-gap electrodes being connected to the cathode; and means for connecting the trigger electrodes and the second electrode of the spark gap to a common source of energy to provide simultaneous excitation of the trigger electrodes and the spark gap.

7. A gaseous-discharge device as claimed in claim 6 and in which the said intervals are at least twice as great as the said predetermined distance.

8. A gaseous-discharge device as claimed in claim 6 and in which the said envelope has cylindrical walls and a substantially planar transparent end-section.

9. A gaseous-discharge device comprising:

a gas-filled envelope;

an anode electrode disposed within the envelope;

a cathode electrode spaced from the anode within the envelope, said anode and cathode electrodes being connected across a source of potential normally ineffective to cause a discharge therebetween;

a plurality of trigger electrodes having their free ends successively disposed in the space and direction between the anode and cathode electrodes, the trigger electrode adjacent to the cathode disposed a predetermined distance from the cathode while the other trigger electrodes are disposed from adjacent trigger electrodes and from the anode at substantially equal intervals greater than the said predetermined distance, the said equal intervals being less than the distance from the free end of each trigger electrode to any portion of the envelope;

a normally unenergized spark gap disposed within the envelope in a position remote from the space between said cathode and anode electrodes but a position from where, when energized, the light produced thereby impinges upon the cathode electrode, said spark gap having a cylindrical insulating member with a first electrode disposed concentrically therein and terminating at one end thereof, and a second electrode disposed on the outer surface thereof adjacent said one end of the insulating member;

means for connecting said plurality of trigger electrodes and said first electrode of the spark gap to a common source of triggering impulses to provide simultaneous energization of said trigger electrodes and said first electrode; and means for connecting said second electrode of said spark gap to said cathode electrode.

References Cited

UNITED STATES PATENTS

| | | | |
|---|---|---|---|
| 2,635,810 | 4/1953 | Townsend | 315—337 X |
| 2,722,631 | 11/1955 | Bowtell | 315—241 |
| 2,775,722 | 12/1956 | Beck et al. | 315—176 X |
| 2,931,948 | 4/1960 | Forgacs | 315—241 |

DAVID J. GALVIN, *Primary Examiner.*

R. L. JUDD, *Assistant Examiner.*